(12) United States Patent
Jellard

(10) Patent No.: US 7,551,525 B1
(45) Date of Patent: Jun. 23, 2009

(54) METHOD FOR PREVENTING EXCESSIVE SKIPPING ON AUDIO DISKS

(75) Inventor: Edward G. Jellard, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,028

(22) Filed: Mar. 31, 2008

(51) Int. Cl.
G11B 21/08 (2006.01)
(52) U.S. Cl. ............... 369/30.1; 369/47.28; 369/47.27; 369/30.11
(58) Field of Classification Search ............... None
See application file for complete search history.

(56) References Cited

U.S. PATENT DOCUMENTS

| | | | |
|---|---|---|---|
| 4,694,441 A * | 9/1987 | Tomisawa et al. ........ | 369/30.25 |
| 4,759,006 A | 7/1988 | Koishi et al. | |
| 5,089,899 A * | 2/1992 | Nomura et al. ............. | 386/102 |
| 5,610,881 A * | 3/1997 | Park ........................ | 369/30.27 |
| 6,061,312 A * | 5/2000 | Kimura et al. ............. | 369/47.54 |
| 6,198,705 B1 * | 3/2001 | Tran et al. ................. | 369/32.01 |
| 6,385,744 B1 | 5/2002 | Ando et al. | |
| 6,912,189 B2 | 6/2005 | Propps et al. | |
| 7,215,608 B2 | 5/2007 | Kim | |
| 2002/0128822 A1 | 9/2002 | Kahn | |
| 2003/0035352 A1 | 2/2003 | Worthington | |

FOREIGN PATENT DOCUMENTS

| | | |
|---|---|---|
| JP | 10112124 | 4/1998 |
| JP | 2002343065 | 11/2002 |
| JP | 2005129188 | 5/2005 |

OTHER PUBLICATIONS

"A Study on the Skipping of Compact Disk Player", authors Oh, Sang-Kyoung; Kim, Gyu-Chool; Son, Jin-Seung; Joo, Jae-Man, Rose-mont, IL, USA; Source: *IEEE Transactions on Consumer Electronics* v38, n3, pp. 208-213; ISSN: 0098-3063.

"VARs See New Horizons With Windows 2000, But For A Fee—Offering new services will require massive training" *Computer Reseller News*, John Yacono, Sep. 27, 1999: 77. *General OneFile*. <http://find/galegroup.com/ips/start.do?prodID=IPS>.

(Continued)

*Primary Examiner*—Joseph Feild
*Assistant Examiner*—Tawfik Goma
(74) *Attorney, Agent, or Firm*—Oppenheimer Wolff & Donnelly LLP

(57) ABSTRACT

The present invention provides for a method for reducing undesirable skipping during playback of a compact disc in a compact disc player. A lens system of the compact disc player reads audio data and subcode data from the compact disc. The subcode data includes Q channel bits and P channel bits. The actual time lapse of the compact disc playback is calculated from the Q channel bits and the P channel bits, while a target time lapse is calculated based on data received from a real-time clock. The difference between the two time lapse values is calculated, and if the differences is greater than a predetermined threshold, the lens system is repositioned to read the audio data from the compact disc corresponding to a predetermined time interval in advance of the current position of the lens system.

1 Claim, 2 Drawing Sheets

OTHER PUBLICATIONS

"Integrated Circuits: The Fast March", *Electronic Engineering Times,* 1989, n565, pub. Nov. 20, 1989.
"1992 Top Component Suppliers" *Electronic Buyers' News,* 1992, n825; pub. Oct. 19, 1992.
*IBM Technical Disclosure Bulletin,* "Defect Skipping Among Fixed Length Records in Direct Access Storage Devices", pp. 1424-1426, Sep. 1976.
"Compact Disc Subcode", Website: <http://en.wikipedia.org/wiki/Compact_disc_subcode>, retrieved Mar. 21, 2008.
"Subcodes", Website: <http://www.e-articles.info/e/a/title/Subcodes/>, retrieved Mar. 21, 2008.
"Definition of Q-Channel", Website: <http://www.pctechguide.com/glossary/WordFind.php?wordInput=Q-channel>, retrieved Mar. 21, 2008.

* cited by examiner

METHOD FOR PREVENTING EXCESSIVE SKIPPING ON AUDIO DISKS

FIELD OF THE INVENTION

This invention relates generally to optical disk players. More specifically, this invention relates to reducing skipping during optical disk playback.

BACKGROUND OF THE INVENTION

An existing shortcoming of current optical disk players is the possibility of the players to effectively enter an infinite loop while playing music or other audio data stored on a disk. Such "skipping" may yield frustrating noises being produced by the player and an annoyance to the audio listener(s).

Existing technologies attempt to address specific difficulties encountered by optical disk players. For example, U.S. Pat. No. 6,912,189 discloses a method for managing defects that may cause an error during a write operation in a write-once data storage disk by maintaining a list of bad addresses. The method detects errors that may occur during the write operation and updates a "skip list" that contains the addresses of physical sectors on the disk that are to be skipped during a read operation.

Another reference executes multi-track read and write operations by embedding pointers that define the location of the next defect anywhere on a given cylinder surface in either the forward or backward direction. See, IBM Technical Disclosure Bulletin, "Defect Skipping Among Fixed Length Records in Direct Access Storage Devices", pp. 1424-1426, September 1976. In the backward direction, the location of the next defect is measured from the track index of the current track. A look-ahead feature allows comparison between the length of a sequence to be read or written and the likelihood of intercept with the defect location, and allows for changing the command list for either skipping the defect or substituting an alternate clock location by an appropriate change in the commend list driving the direct access storage device (DASD).

However, such existing methods and systems rely on specific, non-standardized storage location and data structures for maintaining defect data. For example, disks compatible with these systems require forward-backward pointers for use with and audio disk. Accordingly, these solutions include an added layer of hardware or processing to address the problem of "skipping" that is not readily adaptable to the majority of current disk players.

Many optical disks currently have elements of error-checking, such as Cross-interleaved Reed-Solomon coding and Eight-to-Fourteen Modulation. Cross-interleaved Reed-Solomon coding provides a degree of error correction and detection through interleaving and interpolation. Under Eight-to-Fourteen Modulation the data to be stored is first broken into 8-bit blocks. Each 8-bit block is translated into a corresponding 14-bit codeword using a lookup table. The modulation ensures that the disk's binary coding sequence includes at least two zeroes between every two ones, thereby providing that every pit and land is at least three bit clock cycles long. However, neither of these approaches address the problem of nor prevent skipping due to post-write excessive damage of the disk. Rather, these methods provide for correcting known data errors to be corrected.

U.S. Pat. No. 7,215,608 discloses an apparatus for optical disk reproduction that compensates for a tracking error by using a real-time repetitive control and a method of driving the optical reproducing apparatus. The optical disk reproducing apparatus repetitively compensates for the tracking error in a real time, and the apparatus performs the error correction once per rotation of the disk and does so by calculating tracking errors derived from observations of the physical disk and the motor that spins the disk. However, the apparatus relates specifically to optical disk reproduction that compensates for a tracking error. This approach does not use a real-time code at the time of playback, which is typically contained in most audio CDs, nor would this approach address the issue of skipping for standard audio CDs that are already created or for CDs that are scratched or damaged after they are created.

Accordingly, there is a need in the art of a method and system to prevent or reduce excessive skipping on audio disks. Further, there is a need to provide a method and system that can reduce excessive skipping on audio disks that is capable of either leveraging existing audio disk players and audio disks or being readily incorporated into newly manufactured audio disk players.

BRIEF SUMMARY OF THE INVENTION

The present invention provides for a method for reducing undesirable skipping during playback of a compact disc in a compact disc player. A lens system of the compact disc player reads audio data and subcode data from the compact disc. The subcode data includes Q channel bits and P channel bits. The actual time lapse of the compact disc playback is calculated from the Q channel bits and the P channel bits, while a target time lapse is calculated based on data received from a real-time clock. The difference between the two time lapse values is calculated, and if the difference is greater than a predetermined threshold, the lens system is repositioned to read the audio data from the compact disc corresponding to a predetermined time interval in advance of the current position of the lens system.

DETAILED DESCRIPTION OF THE INVENTION

The present invention will be described in detail with reference to the figures below. The invention generally relates to a system and method for reducing "skipping" during playback of optical disks. This is achieved by comparing an actual time lapse based on data encoded on the optical disk and a target time lapse, and taking corrective action when the two time lapse values deviate by more than a predetermined threshold amount. The present invention thereby requires no additional hardware or minimal additional hardware to be applied to existing disk player technology.

In one embodiment of the present invention, the method includes monitoring time-code data on an optical disk, which may be used to calculate an "actual time lapse" of the disk playback from the beginning of the first track, or any subsequent track, on the optical disk. The method further provides for monitoring a separate timer, which may be a clock or other comparable device configured to measure the duration of lapsed time during playback. This latter time lapse may be considered a "target time lapse". When the target time lapse deviates above a certain threshold level from the actual time lapse, corrective action is taken. For example, the laser of the disk player that is reading and replaying the disk may be advanced by an increasing distance that corresponds to a specified length of playback time.

Figure 1:
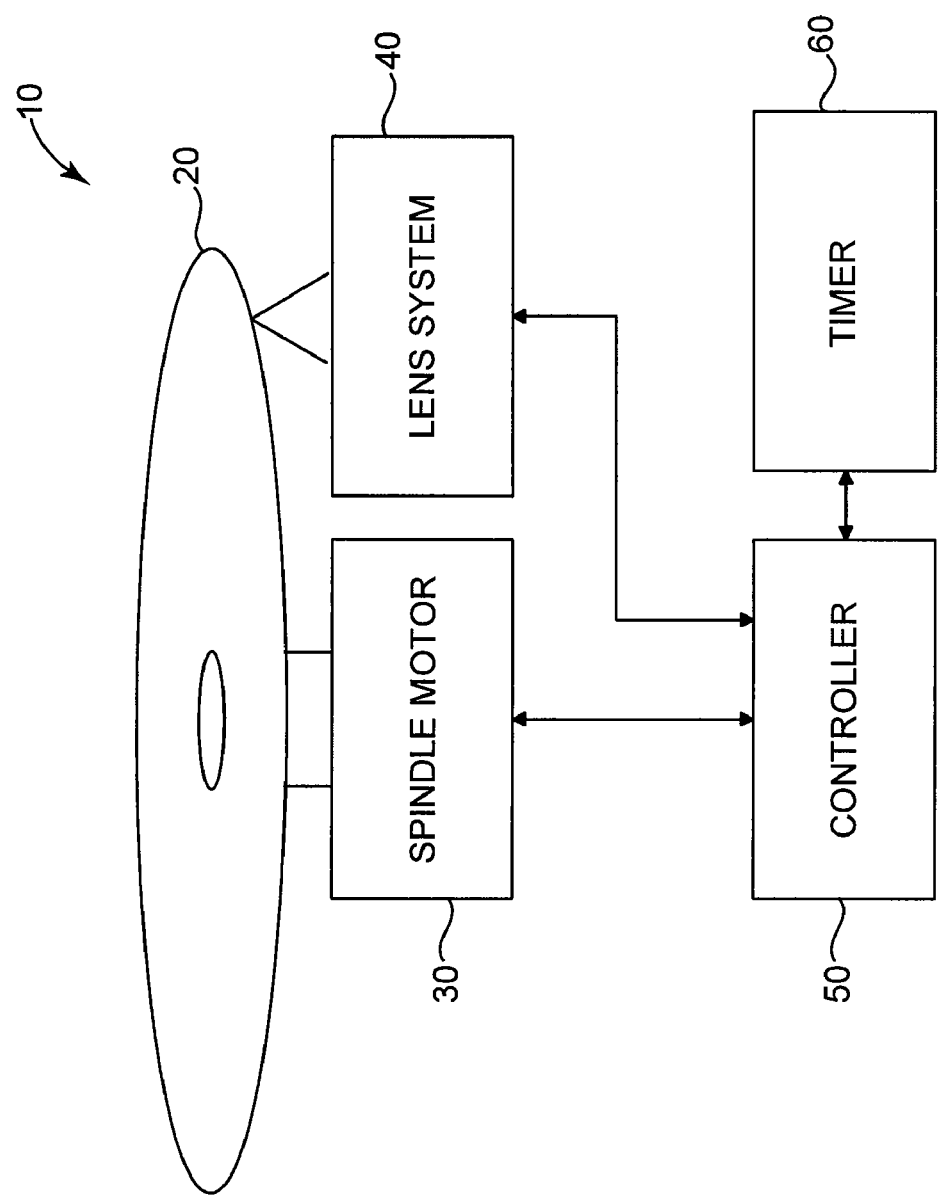
FIG. 1 contains a block diagram illustrating a system for reducing skipping during playback of a compact disc in accordance with one embodiment of the present invention.

Referring now to FIG. 1, an optical disk player system 10 in accordance with one embodiment of the present invention is shown including an optical disk 20, and an optical disk player comprising a spindle motor 30, a lens system 40 including a laser, a controller 50, and a timer 60. Controller 50 may comprise a variety of components for manipulating the movement of the optical disk 20, positioning the lens system 40, reading from the disk with the lens system 40, and processing the data from the disk. For example, the controller 50 may include a tracking mechanism for positioning the lens system 40 and a digital signal processing unit to receive and process data read from the disk.

In the embodiment of the present invention shown in FIG. 1, the optical disk 20 may be a Red Book standard audio Compact Disc, and the optical disk player system 10 is a Compact Disc player. However, those skilled in the art will appreciate that the system and method of the present invention may be applied to other optical disk variations. In operation, the spindle motor 30 rotates the optical disk 20 while the controller 50 positions the lens system 40 to the desired location relative to the optical disk 20 in order to read the data encoded on the disk via the laser in the lens system.

Among other data encoded on the disk 20, the controller 50 receives and processes the audio disk's subcode, which generally contains information on the total number of audio tracks, the running time on the CD, the running time of each track, and other information. For example, typical Compact Disc contains P subcode data that identifies the start of tracks on the CD and may be used to used to indicate the gap between tracks on the CD. Compact Discs further contain Q subcode that includes information relating to track layout, track numbers, time from the start of a track, countdown duration during inter-track pause, and time from the start of the first track. The disk's timecode data is stored in subcode bytes in every frame on a CD, and the subcode data exists alongside the audio data. The timecode information in the Q subcode may be exhibited on a Compact Disc player's display to inform a user of the elapsed time either from the beginning of the first track or from the beginning of a subsequent track.

The P subcode data and the Q subcode data are stored in the P channel and Q channel of the disk respectively. Controller 50, which receives the P subcode data and the Q subcode data, calculates therefrom an "actual time lapse". For example, if the optical disk player plays an optical audio disk from the first track, the controller determines the actual time lapse by summing the duration of any completed tracks, the amount of time elapsed on the current track, and any time attributable to inter-track pauses. If, rather than playing the optical disk from its beginning, the optical disk player is intentionally skipped ahead to a subsequent track or skipped to specific location within a track, the controller will similarly determine the actual time lapse by performing the step of summing as described above, less the time attributable to any skipped tracks or skipped partial tracks. If the Compact Disc Player experiences any skipping during disk playback that results in a portion of the audio being repeated, the additional playback time attributed to re-playing that portion of audio will likewise be aggregated into the actual time lapse.

The controller 50 further receives a signal from timer 60 containing time data from a control timer chip that runs in parallel with and independent of the time-code detection received from the P subcode data and the Q subcode data embedded in the disk. Timer 60, which may be a real-time clock or other suitable device that measures time passage, runs continuously during any time the optical disk player is attempting to play an audio disk. Based on the time data received from timer 60, the controller determines the target time lapse.

Controller 50 monitors both the subcode data on the disk 20 received from lens system 40 and the time data received from timer 60 and compares the values to ensure that the time values for each are synchronized. When the optical disk player has not encountered any skipping during disk playback, the actual time lapse and the target time lapse will typically be substantially identical. If the player experiences skipping, the actual time lapse and the target time lapse will not be substantially identical, and if controller 50 determines that the values deviate beyond an acceptable threshold, the controller initiates corrective action to re-synchronize the actual time lapse and the target time lapse.

The target time lapse may also be referred to as the "control" time-code, and, accordingly, another formulation of this process provides that if the monitored time-code from the subcode data received from lens system 40 deviates from the "control" time-code outside an acceptable predetermined range, controller 50 instructs lens system 40 to move its laser forward along the optical disk to advance beyond the location on the optical disk currently being read. The deviation in time-codes may indicate a scratch or other damage to the optical disk that causes it to skip, and therefore the controller attempts to advance past the damaged area and synchronize the time-code from the disk's subcode data and the "control" time-code. In one embodiment, the predetermined acceptable threshold value of the differential between the time-code from the disk's subcode data and the "control" time-code (i.e., the acceptable amount of time between the actual time lapse and the target time lapse) is 0.1 sec. However, other predetermined threshold values may be 0.25 sec., 0.3 sec., 0.5 sec., or any other suitable duration of time. When the controller 50 detects a differential greater than the predetermined threshold, the controller takes corrective action.

For example, in one embodiment, when the two time-code values deviate outside the predetermined threshold, the controller moves the lens system appropriately to read the next second on the current audio track in order to synchronize the expected time lapse and the actual time lapse. Although this example describes advancing the lens system to read the next second of audio on the disk, thereby advancing over one second of audio, other suitable durations of time may also be used, such as 0.5 sec., 2 sec., 5 sec., 10 sec. or any other suitable duration of time. The controller may alternatively be configured to advance the lens system based on parts or subparts of the disk's frames, tracks, or other storage characteristics of the disk. For example, the controller may instruct the lens system to read the next available frame on the disk.

Figure 2:
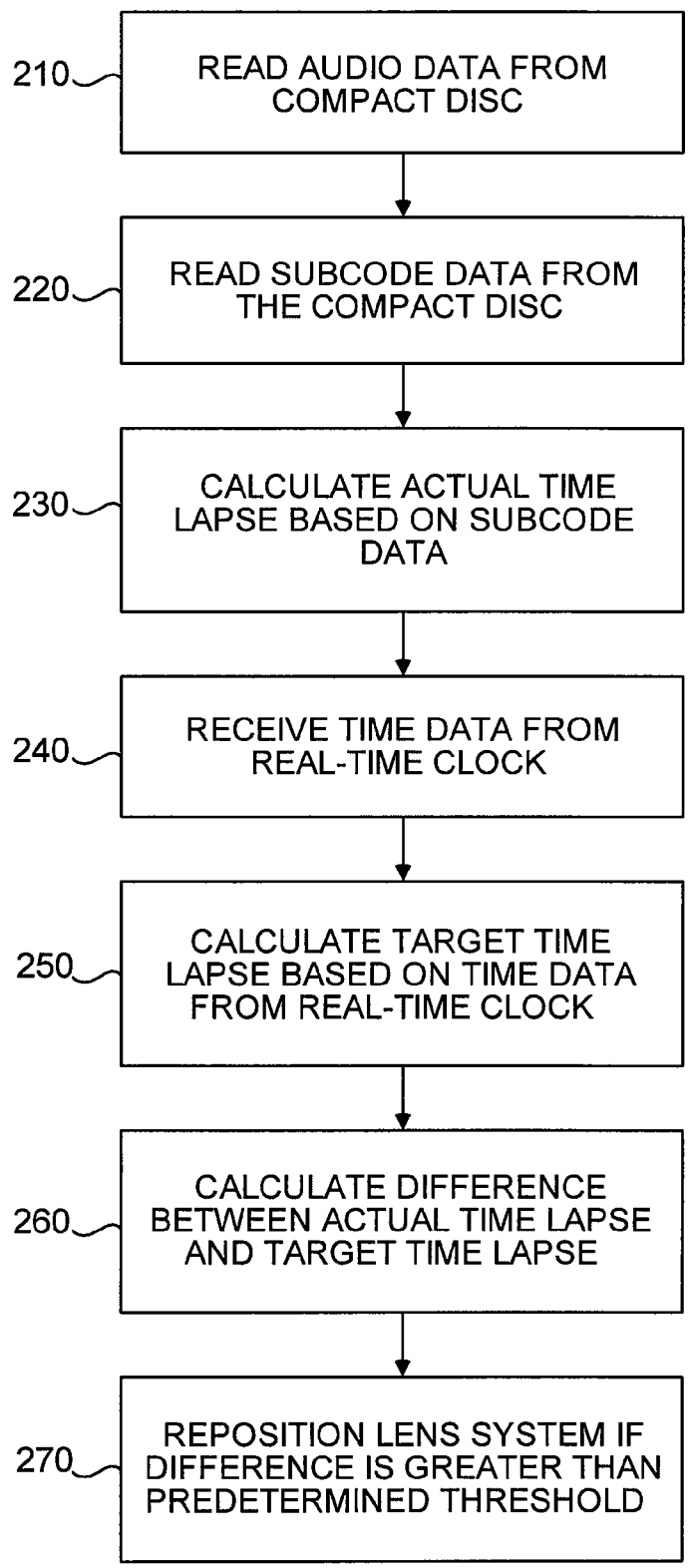
FIG. 2 contains a flowchart of a method for reducing skipping during playback of a compact disc in accordance with one embodiment of the present invention.

Referring now to FIG. 2, a flow chart of one embodiment of the present invention is shown. A lens system of the compact disc player reads audio data, step 210, and subcode data, step 220, from the compact disc. The subcode data includes Q channel bits and P channel bits. At step 230, an actual time lapse of the compact disc playback is calculated from the Q channel bits and the P channel bits. Time data is received from a real-time clock, step 240, and a target time lapse of the compact disc playback is calculated based on the time data from the clock, step 250. At step 260, the difference between the actual time lapse of the compact disc playback and the target time lapse of the compact disc playback is calculated. At step 270, responsive to a determination that the difference is greater than a predetermined threshold value, the lens system is repositioned to read the audio data from the compact disc corresponding to a predetermined time interval in advance of the current position of the lens system.

After the controller takes an initial corrective action, the controller continues monitoring the actual time lapse and the target time lapse and calculating the difference between the two values. If, after a first scratch or other damage is detected and a first corrective measure is executed, a second scratch or damage is detected by another deviation between the two time-code values substantially immediately after the first corrective measure is executed, the controller instructs a second corrective measure. In one embodiment, the second corrective measure is substantially identical to the first; for example, the first corrective measure comprises the controller 50 moving the lens system 40 appropriately to read the next second on the current track and the second corrective measure comprises the controller 50 moving the lens system 40 appropriately to read yet another second forward on the current track.

Alternatively, if a second skip is immediately detected after a first skip, the controller 50 may move the lens system 40 and laser again by an increasing amount until the time-codes are synchronized again. If a second deviation between the two time-code values falls outside the predetermined threshold value substantially immediately after the first corrective measure is executed, the controller may advance the lens system 40 by a greater amount than after the first deviation was detected.

For example, the controller 50 may be configured to advance the lens system 40 forward appropriately to read the next 0.5 sec. on the audio disk after the first deviation is detected, to read the next 1.0 sec. on the audio disk after the second deviation is detected, to read the next 2.0 sec. on the audio disk after the third deviation is detected, etc. Alternatively, the controller 50 may be configured to advance the lens system 40 appropriately forward to read the next 1.0 sec. on the audio disk after the first deviation is detected, to read the next 2.0 sec. on the audio disk after the second deviation is detected, to read the next 4.0 sec. on the audio disk after the third deviation is detected, etc.

Other suitable increasing or decreasing timing schemes may be applied, and the increasing timing schemes may have a time increment cap, for example 10 sec., 16 sec., or any other suitable time cap. By increasing the time increments by which the lens system 40 is advanced, the controller minimizes the possibility of entering an infinite loop if a scratch is encountered past which the first time increment does not completely advance the lens.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for reducing undesirable skipping during playback of a compact disc in a compact disc player, comprising:
    reading audio data from the compact disc with a lens system of the compact disc player;
    reading subcode data from the compact disc, said subcode data comprising a plurality of Q channel bits and a plurality of P channel bits;
    calculating, based on said plurality of Q channel bits and said plurality of P channel bits, an actual time lapse of the compact disc playback, including summing a duration of all completed tracks, an amount of time elapsed on a current track, and all time attributable to inter-track pauses;
    receiving time data from a real-time clock, said real-time clock being a timer that measures time passage and runs independent of the subcode data read from the compact disc;
    calculating, based on said time data from the real-time clock, a target time lapse of the compact disc playback;
    calculating a difference between said actual time lapse of the compact disc playback and said target time lapse of the compact disc playback; and
    responsive to a determination that the difference is greater than a predetermined threshold value, repositioning the lens system to read the audio data from the compact disc corresponding to a predetermined time interval in advance of a current position of the lens system, said predetermined time interval being calculated prior to calculating the difference between said actual time lapse of the compact disc playback and said target time lapse of the compact disc playback.

* * * * *